Feb. 19, 1963 R. R. GUNDERSON 3,077,852
MULTI-POSITION WARNING SIGNAL
Filed Sept. 13, 1961 2 Sheets-Sheet 1
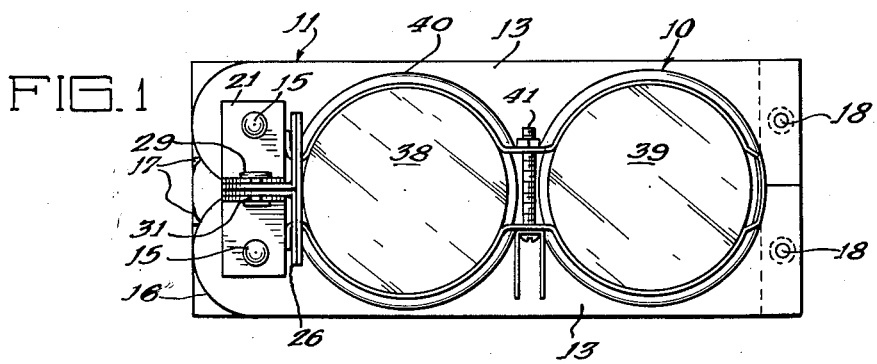
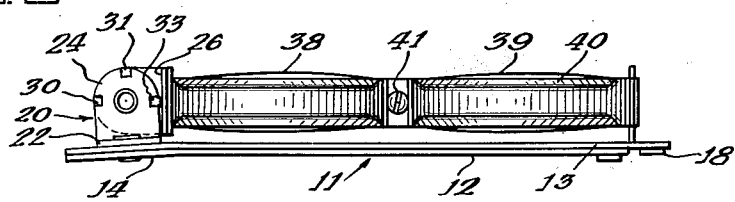
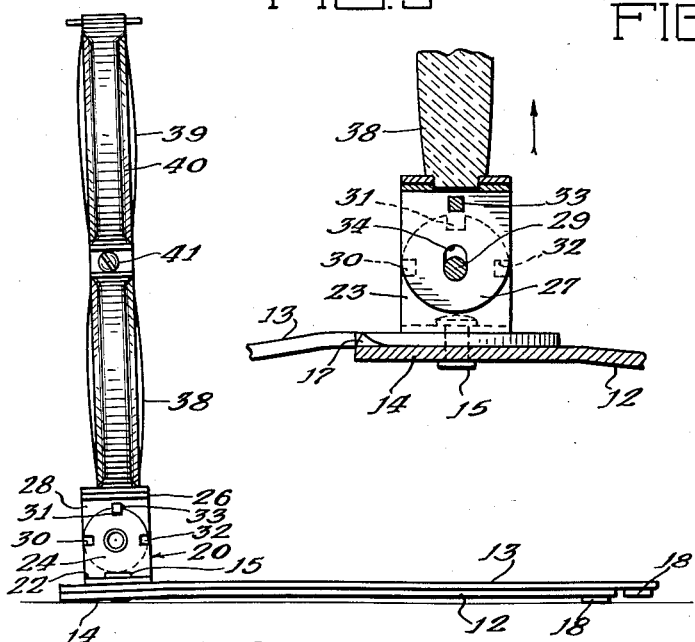
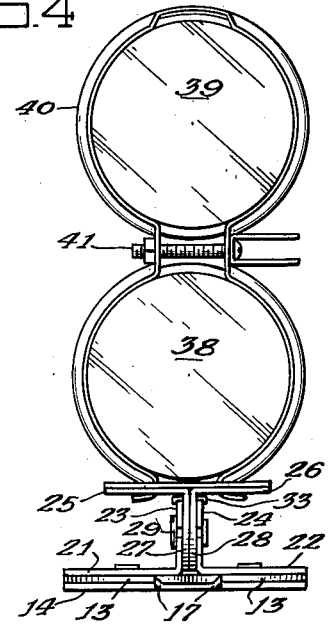
Inventor:
Ralph R. Gunderson
By: Hofgren, Brady, Wegner,
Allen & Stellman
Attorneys Feb. 19, 1963   R. R. GUNDERSON   3,077,852
MULTI-POSITION WARNING SIGNAL
Filed Sept. 13, 1961   2 Sheets-Sheet 2
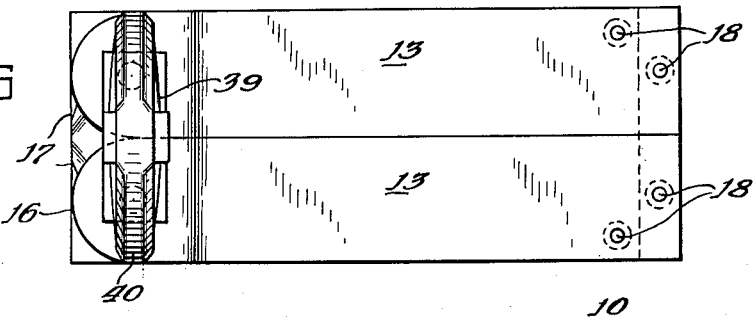
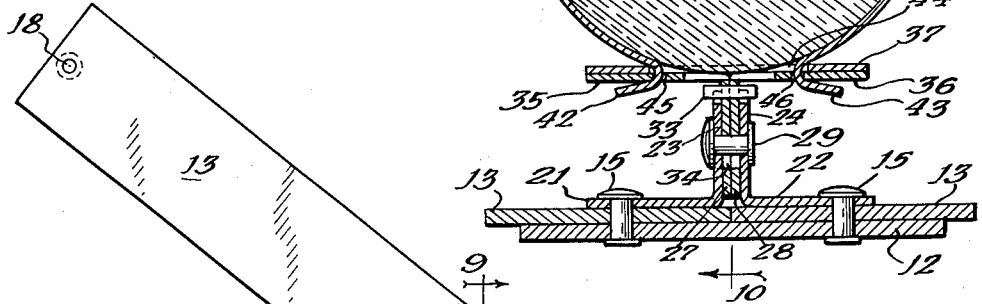
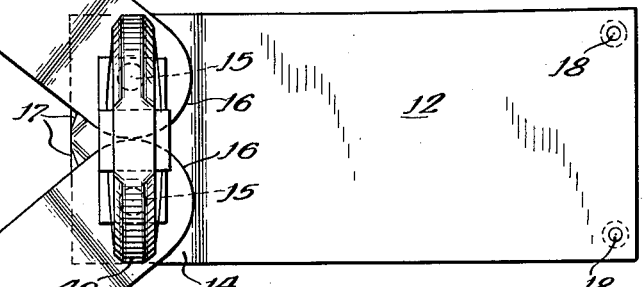
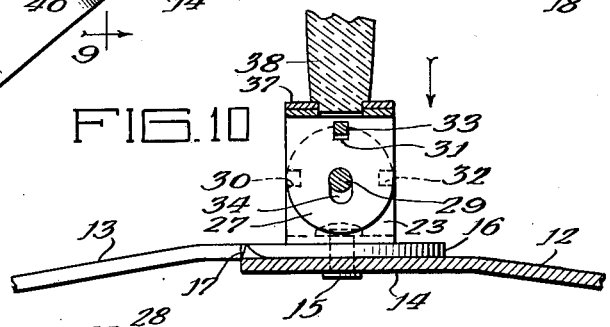
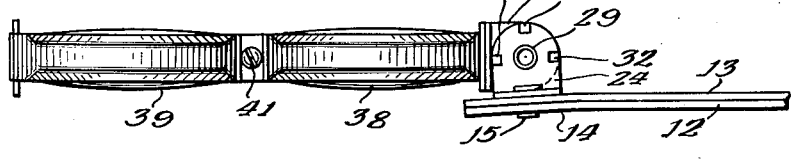

3,077,852
Patented Feb. 19, 1963

---

3,077,852
MULTI-POSITION WARNING SIGNAL
Ralph R. Gunderson, 5520 South Shore Drive,
Chicago, Ill.,
Filed Sept. 13, 1961, Ser. No. 137,813
6 Claims. (Cl. 116—63)

This invention relates to a foldable warning signal of the type commonly used on the highway to warn approaching traffic of the existence of an obstruction or other emergency condition, and more particularly, to a foldable warning signal having a manual latching device capable of positioning the warning signal in one of several operating positions.

Foldable warning signals are commonly carried by private vehicular and commercial truck traffic. The nature of their use requires compactness when stored, stability when being used, and ease of placement in operative position. The warning signal structure of the present invention employs a new and unique co-action between a supporting base and latch means which provides a variety of operative signaling positions.

The primary object of this invention is to provide a new and improved multi-position warning signal.

Another object is to provide a warning signal affording a unique co-action between the supporting base and latch means.

A further object is to provide a warning signal having a manually movable latching means which supports the signaling element in retracted, upright and forward extended positions.

The invention illustrated in a preferred embodiment in the accompanying drawings, in which:

FIGURE 1 is a top plan view of a warning signal with the signaling element and the support legs in retracted closed position;

FIGURE 2 is a side elevational view of the device of FIGURE 1 showing the signaling element latched in retracted position;

FIGURE 3 is a side elevational view of the warning signal with the signaling element in an upright latched position and the supporting legs in closed or retracted position;

FIGURE 4 is a front elevational view of the warning signal taken from the left of FIGURE 3;

FIGURE 5 is a fragmentary enlarged sectional view similar to the sectional view in FIG. 10 but showing the signaling element in upright unlatched position;

FIGURE 6 is a top plan view of the warning signal of FIGURE 3;

FIGURE 7 is a top plan view of the warning signal similar to FIGURE 3 but showing the supporting legs swung forwardly to open supporting position;

FIGURE 8 is a fragmentary side elevational view of the warning signal showing the warning signal frame latched in forward extended position;

FIGURE 9 is a fragmentary sectional view taken as indicated on the line 9—9 of FIGURE 7; and FIGURE 10 is a fragmentary sectional view taken as indicated on line 10—10 of FIGURE 9.

In the embodiment illustrated, a warning signal device, generally designated 10, is swingably mounted on a supporting base or base assembly, generally designated 11, for movement between a closed retracted position (FIGURES 1 and 2), a latched upright position (FIGURE 3) and a forward extended position (FIGURE 8).

As best seen in FIGURE 7, the supporting base 11 includes an elongated base plate or first supporting leg 12 and a pair of secondary supporting legs 13 each pivotally secured to the front end portion 14 of supporting leg 12 by rivets or pivot pins 15. The pivoted end of each of the secondary supporting legs 13 is preferably formed on a radius, as at 16, to provide clearance and mutual reinforcement as the legs are pivoted between retracted closed position (FIGURE 6) and open supporting position (FIGURE 7).

As shown in FIGURE 2, the front end portion 14 of the first supporting leg 12 is bent slightly downwardly at an acute angle to the plane of leg 12 and each of the secondary supporting legs 13 is similarly bent to approximately the same angle so that they lie closely adjacent the upper surface of the supporting legs 12 when in retracted position. As seen in FIGURE 10, the acute angle formed in each of the supporting legs enhances the stability of the warning signal device 10 when it is supported on an uneven surface by spacing the forward end portion 14 from the supporting surface.

A pair of upright stop members 17 (FIGURES 6 and 7) are preferably struck upwardly from the front end portion 14 of supporting leg 12, each stop member being positioned to limit the movement of one of the secondary supporting legs 13 in the optimum supporting position. The supporting ends of each of the supporting legs may be perforated to receive a rubber element 18 which rests on the supporting surface when the legs are in open operative position. In closed retracted position the length of the supporting legs is such that the rubber elements 18 will not interfere with the compactness of the supporting base 11 when folded.

To this end, a loosely journaled hinged structure, generally designated 20, is preferably provided which affords limited relative movement radially of the pivot of the hinged structure between the signaling device 10 and the forward end portion 14 to provide multi-positioning latching of the signaling device as will be described later.

The hinged structure 20 preferably includes an upright extension formed from a pair of L-shaped brackets 21 and 22 (FIGURE 9), spaced laterally of the front end portion 14 and positioned thereon to provide a pair of spaced upright substantially parallel legs 23 and 24 forming the upright extension. The L-shaped brackets 21 and 22 are secured in position by the rivets 15 which also pivotally mount the supporting legs 13.

The upper portion of the hinged structure 20 is preferably formed from L-shaped hinged portions 25 and 26 which have depending leg portions 27 and 28 respectively abutting each other and positioned between the upright legs 23 and 24 of the L-shaped brackets 21 and 22. The depending legs 27 and 28 are each provided with an aligned oblate slot 34, which in turn are aligned with apertures in the upright extension, i.e. legs 23 and 24. A pivot pin or rivet 29 passes through the aligned apertures and slots to afford swinging movement to the hinged structure 20, and the oblate slots 34 permit manual relative movement radially of the rivet 29 between the upright extension and the depending leg portions 27 and 28.

As best seen in FIGURES 5 and 10, the upper ends of the upright legs 23 and 24 are preferably each similarly rounded on a radius, and are provided with three sets of similarly spaced peripheral notches or latching grooves 30, 31 and 32. The depending leg portions 27 and 28 are each impaled by a lug 33 of a size to be firmly and snugly received in any one of the sets of latching notches 30, 31 or 32. As best seen in FIGURE 9, the lug 33 is of such a length as to extend beyond the outer surfaces of the upright legs 23 and 24.

The lower ends of the depending leg portions 27 and 28 are preferably each similarly rounded on a radius, leaving a clearance with the pair of secondary supporting legs 13, thus insuring free swinging movement of the signaling element through 180°.

The oblate slot 34 in the depending legs 27 and 28 allows movement of the lug 33 with respect to the latching notches 30, 31 and 32. FIGURE 10 shows the signaling device latched in upright position, while FIGURE 5 shows the signaling device moved radially of the pivot pin 29 to disengaged position from which position it can be swung to retracted position. The signaling device is latched in any one of its three positions simply by aligning the lug with a set of latching notches and applying force to the signaling device in the direction of the pivot pin 29. In like manner, the signaling device can be disengaged by pulling the signal device away from the rivet 29 and swinging the device to the desired position where it can be latched once more.

As best shown in FIGURES 4 and 9, the L-shaped hinge portions 25 and 26 each have an outwardly extending leg portion 35 and 36 respectively which together with a superposed plate 37 affords a mounting surface for the frame and lenses of the signaling device 10. A lower pair of lenses 38 and an upper pair of lenses 39 are each arranged with reflecting surfaces reflecting outwardly and are held in spaced relation by a bezel 40 forming the frame of the signaling device.

The bezel 40 clampingly embraces a major portion of the peripheral marginal portion of each of the pairs of reflecting lenses 38 and 39 and is provided in its central portion with the nut and bolt 41 so that the bezel is snugly retained about the pair of lenses. The lower free ends 42 and 43 of the bezel 40 preferably are passed transversely through an opening 44 in the mounting plate 37 and through slots 45 and 46 in the leg portions 25 and 26, and then are bent or crimpled outwardly beneath these leg portions to securely anchor the lens structure.

It should be noted that the co-action of the latching means of the present invention provides positive latching of the signaling device 10 in its closed or storage position (FIGURE 2), in its upright position (FIGURE 3), and in its forward extended position (FIGURE 8). When the signaling element is swung 180° from reclining position to forward extended position, the supporting legs 13 may be retained in closed position and the supporting base 11 may be impaled in mud, snow or the like to support the warning signal 10 in an upright operative position. When the signaling device is in any one of its latched positions, considerable force is necessary to disengage the latching means, thus assuring that the signaling device will be retained in its intended position.

The foregoing detailed description is given for clearness of understanding only and no unnecessary limitations should be understood therefrom, for some modifications will be obvious to those skilled in the art.

I claim:

1. A foldable support for a warning signal, comprising: a supporting base having an upright extension at its forward end; a signaling element having a lower end loosely journalled on said extension to afford limited relative movement of said lower end with respect to said extension radially of the journalled connection, said signaling element being swingable between a retracted position adjacent said supporting base and an upright position; and cooperating latch members on said lower end and on said extension, the latch member on said lower end being arcuately swingable therewith and being manually radially movable with the lower end to effect latching engagement with the latch member of the extension to support the signaling element in upright position.

2. A foldable support for a warning signal, comprising: a supporting base having an upright extension; a signaling element having a lower end loosely journalled on said extension to provide limited relative movement of said lower end with respect to said extension radially of the journalled connection, said signaling element being swingable from a retracted position through upright position to a forward extended position; and cooperating latch members on said lower end and on said extension, the latch member on said lower end being manually radially movable with the lower end to effect latching engagement with the latch member of the extension to support the signaling element in retracted, upright and forward extended positions.

3. A foldable support for a warning signal, comprising: a supporting base assembly having a first supporting leg and a pair of secondary supporting legs pivoted to said first supporting leg and juxtaposed with said first leg when in retracted position, said secondary legs being swingable forwardly to a laterally spaced supporting position; a warning signal frame hingedly secured at one end to the front end portion of said supporting base assembly for swinging movement from upright signaling position to reclining position over said supporting base assembly; and cooperating latching elements on said one end of the warning signal frame and on the front end portion of the supporting base assembly to latch the signal frame in upright position, one of said latching elements being manually movable with respect to the other to effect latching engagement and retain the signal frame in upright position.

4. A foldable support for a warning signal, comprising: a supporting base assembly having a first supporting leg and a pair of secondary supporting legs pivoted to said first supporting leg and juxtaposed with said first leg when in retracted position, said secondary legs being swingable forwardly to a laterally spaced forward position; a warning signal frame hingedly secured at one end to the front end portion of said supporting base assembly for swinging movement from upright signaling position to reclining position over said supporting base assembly; and cooperating latching elements on said one end of the warning signal frame and on the front end portion of the supporting base assembly to latch the signal frame in upright position, said latching elements being manually radially movable relative to each other to effect latching engagement, one of said latching elements including a latching lug and the other of said latching elements including a notched portion of a size to snugly receive said latching lug whereby said relative movement between said lug and notched portion effects latching engagement of the signal frame in upright position.

5. A foldable support for a warning signal, comprising: a supporting base assembly having a first supporting leg and a pair of secondary supporting legs pivoted to said first supporting leg and juxtaposed with said first leg when in retracted position, said secondary legs being swingable forwardly to a laterally spaced forward position; a warning signal frame hingedly secured at one end to an upright extension of said supporting base assembly for swinging movement from forward extended position and upright position to retracted position over said supporting base assembly; and cooperating latching elements on said one end of the warning signal frame and on the upright extension of the supporting base assembly to latch the signal frame in upright position and in forward extended position, said latching elements being manually radially movable relative to each other to effect latching engagement, the latching element on the warning signal frame including a latching lug and the latching elements on the upright extension including a plurality of notches each of a size to snugly receive the latching lug whereby said relative movement between the lug and the notches will effect latching engagement of the warning signal frame in any one of said positions.

6. A foldable support for a warning signal, comprising: a supporting base having an upright extension provided with a rearwardly opening notch and an upwardly opening notch; a pivot pin secured transversely of the upright extension; a signaling element having a lower end provided with an oblate slot for receiving the pivot pin to afford limited relative movement of said lower end with respect to said extension radially of the pivot pin and to afford swingable movement of said signaling element between retracted and upright position; and a latching lug on said lower end of the signaling element of a size to be snugly and selectively fitted in each of said notches whereby said relative movement between the lug on the lower end of the signaling element and the notches on the upright extension permit the signaling element to be selectively latched in retracted and in upright position.

References Cited in the file of this patent

UNITED STATES PATENTS

| | | |
|---|---|---|
| 1,262,712 | Stone | Apr. 16, 1918 |
| 1,705,580 | Marburger | Mar. 19, 1929 |
| 2,436,298 | Gunderson | Feb. 17, 1948 |
| 2,536,177 | Haskins | Jan. 2, 1951 |